Figure 1:
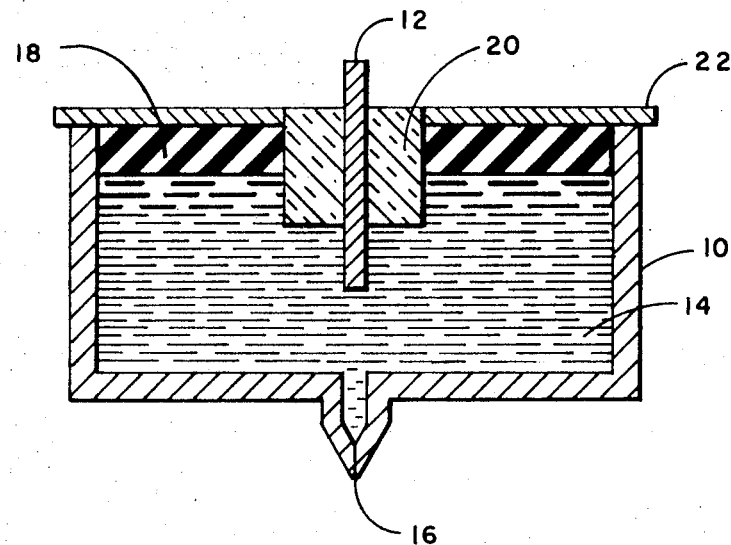

United States Patent [19]

Walk et al.

[11] 3,746,940

[45] July 17, 1973

[54] NON-AQUEOUS CADMIUM COULOMETER

[75] Inventors: Charles R. Walk, King of Prussia; Sandors G. Abens, Philadelphia, both of Pa.

[73] Assignee: Honeywell Inc., Minneapolis, Minn.

[22] Filed: Sept. 1, 1971

[21] Appl. No.: 177,036

[52] U.S. Cl.................... 317/230, 317/231, 136/24
[51] Int. Cl............................................... H01g 9/00
[58] Field of Search ................... 136/6 R, 6 LH, 24, 136/83, 100, 155, 86 D; 317/230, 231

[56] References Cited
UNITED STATES PATENTS

| | | | |
|---|---|---|---|
| 3,392,059 | 7/1968 | May | 136/86 D |
| 3,484,296 | 12/1969 | Buzzelli | 136/155 |
| 3,553,031 | 1/1971 | Byrne et al. | 136/100 R |
| 3,326,721 | 6/1967 | Henderson et al. | 136/24 |
| 3,564,349 | 2/1971 | King | 317/230 |
| 3,710,201 | 1/1973 | Ikeda | 317/231 |

*Primary Examiner*—A. B. Curtis
*Assistant Examiner*—H. A. Feeley
*Attorney*—Charles J. Ungemach, John S. Munday et al.

[57] ABSTRACT

An electrolytic cell including an electrolyte solution, a first electrode having a cadmium surface in contact with and electrochemically active with the electrolyte and a second electrode, which is insulated or spaced from the first electrode. The second electrode has a surface in contact with and chemically inert to the solution. The electrolyte comprises a solution of an alkali metal-cadmium-iodide complex in methyl formate. The electrolytic cell may be used as a plating cell for depositing cadmium electrolytically on the surface of the second electrode. It also may be used as a coulometer, to measure the number of coulombs deposited during plating. Accordingly the cell may be used as a timing device where the superior characteristics are needed.

6 Claims, 2 Drawing Figures

Patented July 17, 1973

3,746,940

CHARLES R. WALK
SANDORS G. ABENS
INVENTOR.

BY *James L. Lindsay*

ATTORNEY

A NON-AQUEOUS CADMIUM COULOMETER

FIELD OF THE INVENTION

This invention generally relates to a non-aqueous electrolytic cell system useful in a number of applications. Basically, a novel electrolyte solution hereinafter described has been discovered which permits the use of a wide variety of inert or passive electrodes in combination with a cadmium electrode.

DESCRIPTION OF THE PRIOR ART

Electrolytic cell systems for a variety of electrochemical devices have been well known for a long time. U.S. Pat. No. 3,423,643 describes an aqueous cell system in which silver is used as a first electrode and a silver salt dissolved in aqueous phosphoric acid is employed as an electrolyte solution. Non-aqueous systems have recently been developed, in which certain improved results have been found. U.S. Pat. No. 3,380,855 shows a cell wherein an electrolyte is employed comprising lithium perchlorate dissolved in methyl formate. That cell system is useful as a power producing cell.

One other aqueous cell system which has been proposed includes the use of cadmium as an electrode. In a paper presented at the Electrochemical Society the Southern California-Nevada Section, on Dec. 2, 1966 by Mr. Louis Belove, a cadmium coulometer is disclosed using the cadmium electrodes from a conventional cadmium battery. The electrolyte solution is an aqueous potassium hydroxide electrolyte and both of the electrodes initially are cadmium hydroxide. During charging, one of the electrodes is converted to cadmium.

At the present time, there is no electrolytic cell system which could be used in the manner presently contemplated in this invention, which employs cadmium and a non-aqueous electrolyte. Aqueous systems have been found to operate satisfactorily in some instances, where the extent of use is not severe or when the length of time that the charge is to be stored, such as when the cell is used as a coulometer, is not a significantly long period of time.

One of the problems of aqueous cells is inherent in the use of water itself. Water is particularly reactive as a solvent and any impurities which are present in the system, which one can understand is always a problem, will react with the plated material to disrupt the plated out material and precipitate out or otherwise destroy the accuracy of the amount of metal which has been transferred during charging. Because of the reactive nature of water, reducing agents cannot be employed to eliminate impurities without adversely affecting the solvent.

When one attempts to obviate this problem by turning to non-aqueous solvents, one is faced with a different sort of problem. The selection of a suitable solvent, which may be stable for significant periods of time while yet being unreactive to the particular electrodes being employed, is difficult and there are no guidelines to use for the selection of the solvent. Even more important, many non-aqueous solvents do not possess sufficient solubility to permit the dissolution of a salt therein which is capable of supporting the electrolytic reactions. In addition, unwanted side reactions are to be avoided.

If such a system could be discovered, it would then be possible to employ a reducing agent in the cell to eliminate impurities which would oxidize the plated metal. The reducing agents would have to be soluble in the system and strong enough to reduce the impurities which could possibly oxidize the plated metal, yet they must not be strong enough to reduce the electrolyte itself.

OBJECTS OF THE INVENTION

Accordingly, it is an object of this invention to provide an economical electrolytic cell which employs a non-aqueous solvent.

It is a further object of this invention to provide a non-aqueous electrolytic cell which employs as a first electrode a cadmium electrode, such that the electrolytic process is capable of plating cadmium on a second electrode over a wide temperature range.

Yet another object of this invention is to provide an electrolytic cell which is capable of maintaining a charge placed therein when operated as a coulometer for long periods of time without material alteration of the charge there in place. Yet another object of the invention is to provide a device with improved current, voltage, and cycling characteristics.

DESCRIPTION OF THE INVENTION

It has now been discovered that the above objects may be accomplished in the following manner. Basically, it has been discovered that an electrolytic cell may be built which includes a non-aqueous liquid solution of an electrolyte, a first electrode having a cadmium surface in contact and electrochemically active with the electrolyte and a second electrode spaced from the first electrode and having a surface in contact with and chemically inert or passive to the electrolyte. The electrolyte comprises a solution of an alkali metal-cadmium-iodide complex in methyl formate.

The particular material construction of the electrolytic cell may be accomplished in a wide variety of ways as long as the two electrodes are electronically insulated from each other except through common contact with the electrolyte. Although cell construction forms no part of the present invention, it is believed that a better understanding of the invention may be had from a description of several cells.

IN THE DRAWINGS

Figure 2:
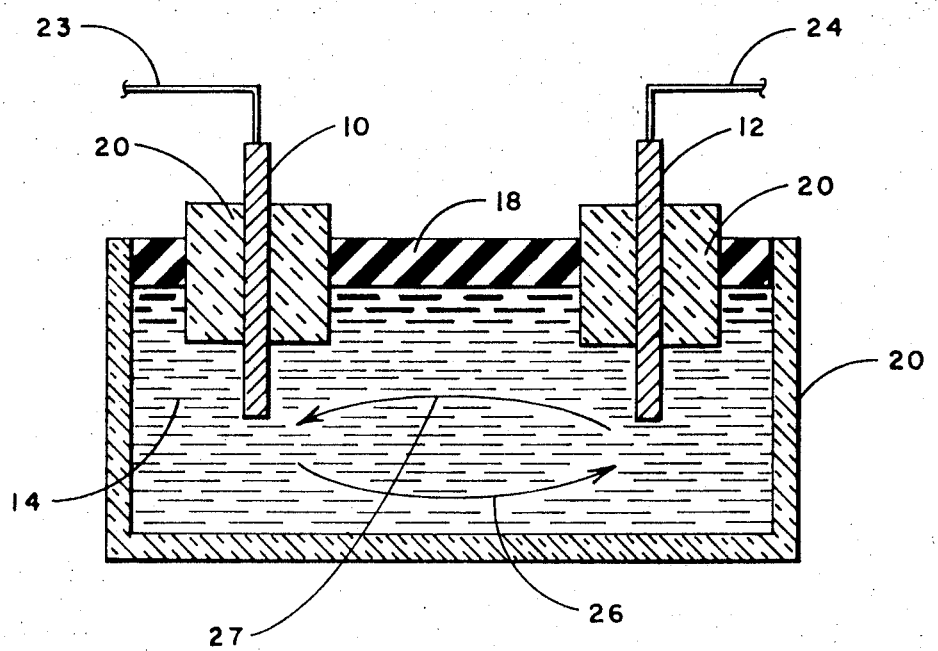

For a more complete understanding of the present invention, reference is hereby made to the drawings, in which:

FIG. 1 is a cross sectional view of a cell showing one embodiment of the present invention; and FIG. 2 represents a second embodiment of the invention, shown in cross section.

A simple form of the electrolytic cell of the present invention is represented in FIG. 1, in which a first electrode 10 having a cadmium surface defines a receptical for the rest of the cell. In the present instance, the entire tank or container 10 is metallic cadmium. In an alternative embodiment, the tank 10 could be manufactured from many materials as long as the interior surface contained a quantity of cadmium metal which would be the only active electrolytic material in contact with the electrolyte 14.

A second electrode 12 is also placed in contact with the electrolyte solution 14 and is insulated from the first electrode 10 by a rubber spacing ring 18 and ceramic or glass or otherwise electrochemically inert insulating mounting 20 for the electrode 12. The electrode 12 may be manufactured from a wide variety of materials, with the only requirement being that the electrode 12 be chemically inert to the electrolyte, defined hereinafter. Then any suitable second electrode may be selected as long as it is both chemically inert to the electrolyte and provides a suitably, electronically conducting surface for plating cadmium. Of the many electrode materials which are suitable, it is preferred that, for the purposes of this invention, the electrode be selected from the group of platinum, nickel, gold, silver and stainless steel. Of these, platinum, and nickel surfaces are most preferred.

The electrolyte solution 14 comprises a solution of an alkali metal-cadmium-iodide complex dissolved in methyl formate. While any of the alkali metals are suitable, due to reasonable availability and cost criteria, the most common alkali metals such as sodium, potassium and lithium are preferred. Of these, lithium is most preferred.

Preparation of the electrolyte is simply done by reacting an alkali metal iodide and cadmium iodide in the solvent and we believe on dissolving, the complex $MCdI_3$ is formed where M is an alkali metal. The concentration of the complex salt in the solvent may vary, depending upon the desired conductivity. For most applications, normally, one molar to three molar solutions of the complex in the methyl formate have been found to be adequate, and for that reason are preferred.

Referring again to FIG. 1, it can be seen that the cadmium electrode 10 is separated from the second electrode 12 by a non-conducting insulator 20. Outer ring 18 is optional even in FIG. 1 but is manufactured from rubber or other suitable materials which are non-conductive and are non-reactive to the electrolyte system to isolate 22 from contact with the electrolyte. The top of the cell system has a plate 22 which may be manufactured from copper or other conductive metals and which is insulated from the electrode 12. Thus, by connection to the plate 22, and to the electrode 12, current may be passed through the electrolyte system.

Also shown is a manner of filling the cell with electrolyte solution after its construction. During manufacture, the point 16 of the cell may be left open and the cell may be stored until completion is desired. When it is desirable to use the cell, the electrolyte containing the alkali metal-cadium-iodide complex is prepared and introduced into the cell through opening 16. This opening 16 is then crimped or otherwise sealed.

An alternative manner of constructing an electrolytic cell of the present invention is shown in FIG. 2. In this device, the cadmium electrode 10 is mounted in an insulator 20 and positioned to be in contact with the electrolyte solution 14. Similarly, the negative potential electrode 12 is supported by an insulator 20 and positioned to contact the electrolyte solution 14. Both of these electrodes 10 and 12 are mounted in a container 20 and the respective electrodes 10 and 12 are separated by an insulating material 18. Wires 23 and 24 lead from the electrodes 10 and 12 respectively.

While the reaction mechanisms of the liquid state are rarely understood, the operation of this electrolytic cell of this invention, is basically concerned with one overall reaction, that being the reversible reaction of cadmium metal to cadmium ions. This reaction is $Cd = Cd^{++} + 2e^-$. By passing a current between the two electrodes 10 and 12 it is possible to drive the above cadmium-cadmium ion reaction in one direction or the other at an electrode, depending upon the direction which the electrons are flowing. Thus, to plate cadmium on the inert electrode 12, the positive terminal is connected to line or wire 23 and the negative terminal of the current source is connected to wire 24. The internal "current" flows from the positive terminal or electrode 10 to the negative terminal or the electrode 12. However, the negative ions pass in the opposite direction of the current and therefore flow from the negative electrode 12 to the positive electrode 10 in the direction of arrow 27. When this occurs, electrons are withdrawn from the cadmium source (in this case the electrode 10), and cadmium ions are produced in solution. Simultaneously, cadmium ions are attracted to the negative electrode 12 and receive electrons thereat, causing plating of cadmium on the electrode 12. By recording the amount of current which has passed through the cell, and noting the time over which this current has been flowing, one has in effect measured the amount of charge stored in the cell. Because of the stability of the system this charge will remain on the second electrode 12 until such time as the current is reversed.

Since the product of the current and the time has been measured in storing the charge, it is now possible to measure either current or time when the poles are reversed. By making electrode 12 positive and the cadmium electrode 10 negative, the current will flow internally from the electrode 12 to the cadmium electrode 10. The negative ions will flow from electrode 10 to electrode 12 in the direction of arrow 26. At the cadmium electrode 10, electrons will be in excess and the cathodic reaction that will take place will be the combination of cadmium ions and electrons to form cadmium metal, which will plate out on the cadmium electrode. At the anode or positive electrode 12, the plated cadmium will be deprived of electrons and cadmium ions will be produced. Thus, if it is desirable to determine the strength of a current, this current can be passed in this manner while measuring the time it takes for all of the cadmium to be removed from the negative potential electrode. Since the product of the current and the time in the plating step was known and since the time in the discharge step was known, the current can readily be calculated.

More often, however, this device may be used as a timing device. For example, a known current can be passed for a known period of time through the device in the plating step, that is, where the positive electrode is the cadmium electrode 10, to store a charge in the cell. Then a predetermined current can be selected for passage through the cell in the reverse direction, that is, where the positive electrode is the cadmium plated inert electrode 12, so as to cause the exhaustion of the plated cadmium at a preselected time. At this time, the cell no longer has a small potential (and is therefore "timed out"), and the potential difference between the cadmium electrode 10 and the second or inert electrode 12 will act as a potential barrier. At this point a significant voltage jump will be observed, and this voltage jump may be used as a signal that the particular time has expired.

Devices of this type would find many uses in a wide variety of applications. For example, such a cell may be precharged and then connected to a source of known current. This cell and its accompanying source of current could then be placed in a circuit which would be inactive until the voltage jump occurred. The circuit could further include a means for initiating another function of the circuit at that time when the cadmium had been completely depleted from the inert second electrode. This other function means would merely have to be sensitive to a voltage jump of 0.7 volts which is sufficient to open a junction of a silicon transistor. The aqueous electrode potential of cadmium is +0.4. In the case of the use of one of the preferred electrode materials, such as platinum, which has an electrode potential of −0.9, a far greater voltage would be realized. However, in this system, due to the electrode potential of the iodine, from the complex dissolved in methyl formate (since iodine has an electrode potential of −0.5V, approximately,) the maximum voltage jump which would be noticed would be approximately 0.9 volts (the sum of the cadmium potential 0.4 and the iodine potential −0.5).

Although the cell system as above described is highly suitable for the uses described, occasionally extremely long periods of time for holding the charge would be desirable. If, for example, one would wish to store a small charge for two or three years, it would be desirable to have additional stability of the plated cadmium. This stability can be provided in a preferred embodiment of the present invention, which comprises the addition of a reducing agent to the electrolyte solution. This reducing agent should be soluble in the electrolyte, strong enough to reduce impurities that would oxidize cadmium, and will not reduce the electrolyte. Although many reducing agents may be employed, it is preferred that sodium borohydride ($NaBH_4$) be used since it is exceptionally well fitted to the above-enumerated qualifications.

A number of experiments were performed with several of the alkali metal cadmium iodide salts in cells according to the present invention. In each case, a known amount of current was added to the electrolyte cell for a known amount of time, in such a manner so as to cause plating of the cadmium on the second or inert electrode. After that time, a known quantity of current was passed in the reverse direction, to cause removal of the plating from the second or inert electrode. The time necessary to remove this plating was measured until the voltage jump was recorded, indicating the exhaustion of plated cadmium.

EXAMPLE I

In this example, a two molar solution of potassium-cadmium-iodide dissolved in methyl formate was used for the electrolyte. Twenty microamps of current were passed through the cell for 600 seconds, thereby plating cadmium on a platinum electrode. The temperature during this experiment was 25° C. The current was then reversed while maintaining 20 microamps of current and it was determined that 599.4 seconds were necessary to remove the plated cadmium. This efficiency of 99.9% was as close as could be expected with manual switching of the currents during time in.

EXAMPLE II

The same electrolytic cell system using the potassium-cadmium-iodide two molar solution in methyl formate was used for a similar experiment at 75° C. In this case, 20 microamps of current were introduced for 600 seconds. Upon reversal of the 20 microamps, and removal of the plated cadmium from the platinum electrode, 585 seconds elapsed before the cadmium was completely removed and the cadmium-platinum cell generated an increase in voltage. This represents an efficiency of 97.5%.

EXAMPLE III

In this example, and in the following examples, a two molar solution of lithium cadmium iodide dissolved in methyl formate was used as the electrolyte solution. Again, a cadmium first electrode was employed along with an inert second electrode. One thousand microamps of current were passed through the cell in plant condition for five seconds, thereby causing plating of cadmium on the platinum electrode. To remove the cadmium, a 10 microamp current was passed through in the reverse direction. Since the product of the current times the time is equal in both cases, a theoretical 500 seconds should have elapsed before the voltage jump was indicated. In this experiment, 498.5 seconds were required to obtain the indicative voltage jump, giving an efficiency of 99.5%.

EXAMPLE IV

Using the electrolyte solution of Example III 500 microamps of current were passed through the cell to plate cadmium on the platinum electrode for two seconds. Current was then passed in the opposite direction through the cell to remove the plated cadmium and 10 microamps of current were employed. Instead of the theoretical 100 seconds necessary to achieve the voltage jump indicating removal of all of the plated cadmium, 99.8 seconds were measured, indicating an efficiency of 99.8%.

EXAMPLE V

In this instance, the same solution as used in Example III and IV was charged with 120 microamps for 5 seconds, causing plating of cadmium on the second or inert electrode. The poles of the current generating source were then reversed and 12 microamps of current were passed through the cell so as to remove the plated cadmium from the second or inert electrode. A theoretical 50 seconds would be required for this removal. In this experiment, 50.1 seconds were required, indicating an efficiency of greater than 100%. This is attributed to possible human error in measuring the time the current was actively causing plating of the cadmium on the platinum electrode.

EXAMPLE VI

The experiment set forth in Example V was duplicated, with the exception that the temperature of the experiment was held at −40° C. In this experiment, 120 microamps of current were applied for 5 seconds to cause plating of the cadmium on the negative potential electrode. Upon reversal of the current and passage of 12 microamps of current to remove the cadmium from the second electrode, 46.6 seconds were measured before the voltage jump indicated the removal of the cadmium. This is compared with a theoretical 50 seconds or giving an efficiency of 93.2%.

EXAMPLE VII

In a seventh experiment, potassium cadmium iodide was employed in a two molar solution of methyl formate using a cadmium first electrode and a nickel second electrode using a current of 20 microamps both for time in and time out. The efficiency at 25° C. was 97.8% and at 75° was 100.0%.

EXAMPLE VIII

Using the electrolyte solution of Examples I and II, 20 $\mu$a of current were passed through the cell to plate cadmium on the second electrode (in this case Ni plated Kovar) for 10 minutes before it was stored at plant temperature in the timed-in condition. After two years, 20 $\mu$a of current were passed in the opposite direction through the cell at plant temperature to remove the cadmium that had been plated two years earlier. Instead of the theoretical 600 seconds (10 minutes) necessary to achieve the voltage jump indicating removal of the plated cadmium, 550 seconds (9.17 minutes) were measured, indicating an efficiency of 91.7% after two years of casual storage. The high efficiency after this long period of time is attributed to the presence of a small amount of sodium borohydride ($NaBH_4$) in the electrolyte.

These experiments and others of similar results were performed in a wide variety of cell constructions. As has been stated above, the particular details of the cell construction do not form a part of this invention, as long as the first electrode is cadmium, the second electrode is inert to the electrolyte solution and is insulated from the first electrode. Along with this, the electrolyte must comprise an alkali metal-cadmium-iodide complex in methyl formate. The form of the cell construction is immaterial, and has been found that cadmium electrode may be in the form of the container of the electrolyte solution, or the container may be lined with cadmium, as long as no electrolytic materials penetrate the lining, or the can may be of an inert material with cadmium electrode positioned in a manner similar to that shown in FIG. 2.

Other embodiments will become apparent to those skilled in the art upon the reading of the instant disclosure.

Having thus described the invention, what is claimed is:

1. A coulometer comprising:
   a wide temperature range liquid solution electrolyte;
   a first electrode having a cadmium surface in contact and electrochemically active with said electrolyte; and
   a second electrode spaced from said first electrode, having a surface in contact with and chemically inert to the electrolyte;
   said electrolyte comprising a solution of an alkali metal-cadmium-iodide complex in methyl formate.

2. The coulometer of claim 1 wherein said second electrode is selected from the group consisting of platinum, nickel, gold, silver and stainless steel.

3. The coulometer of claim 1 wherein said alkali metal is lithium.

4. The coulometer of claim 1 wherein said complex ranges in concentration from one molar to three molar in said methyl formate.

5. The coulometer of claim 1 which further includes a reducing agent in said electrolyte solution, said agent being inert to said electrolyte.

6. The coulometer of claim 5 wherein said reducing agent is sodium borohydride.

* * * * *